J. A. JOHNSON.
CLOSURE FOR HAY FORK TRACK OPENINGS.
APPLICATION FILED APR. 28, 1920.
1,375,391.
Patented Apr. 19, 1921.
2 SHEETS—SHEET 1.
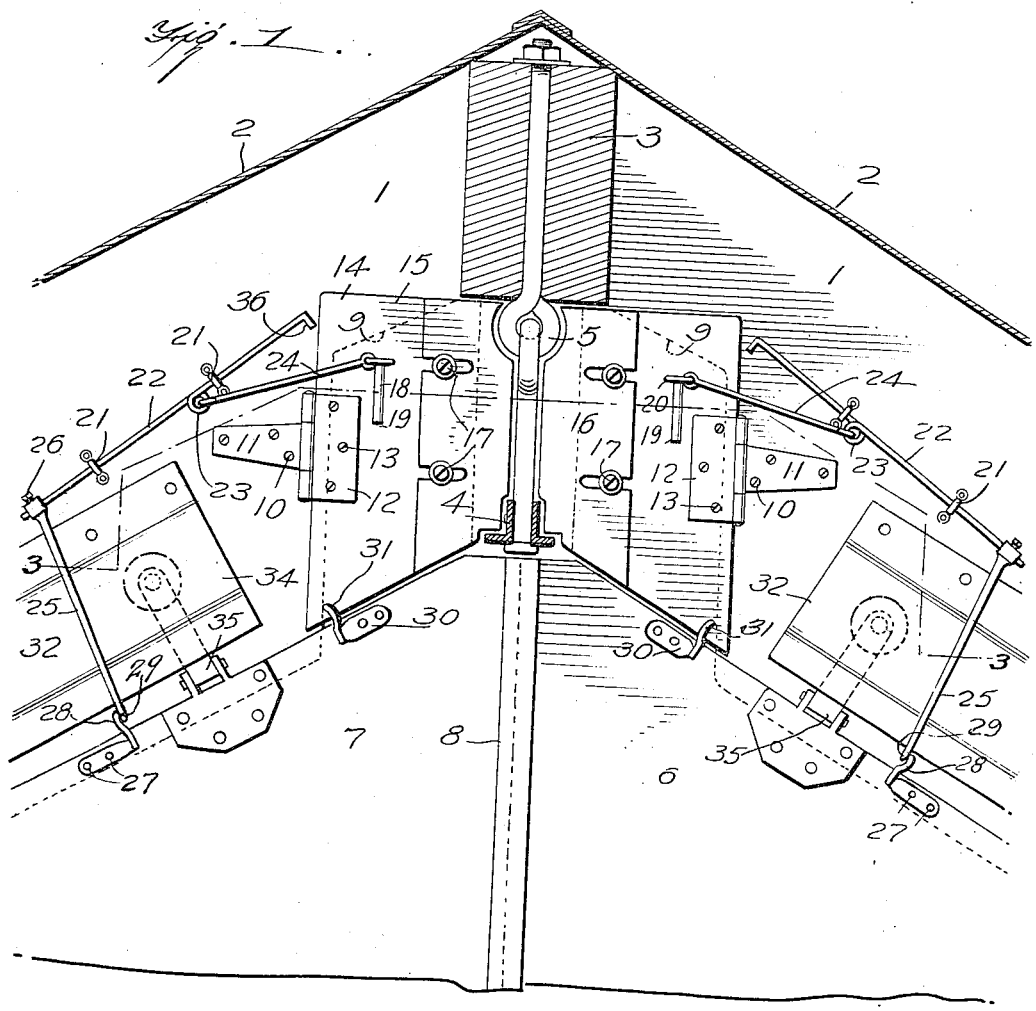
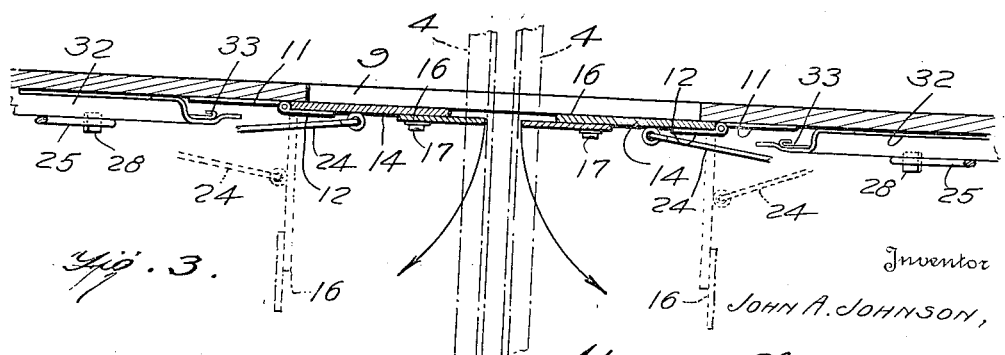
Inventor
JOHN A. JOHNSON,
By Watson E. Coleman,
Attorney.

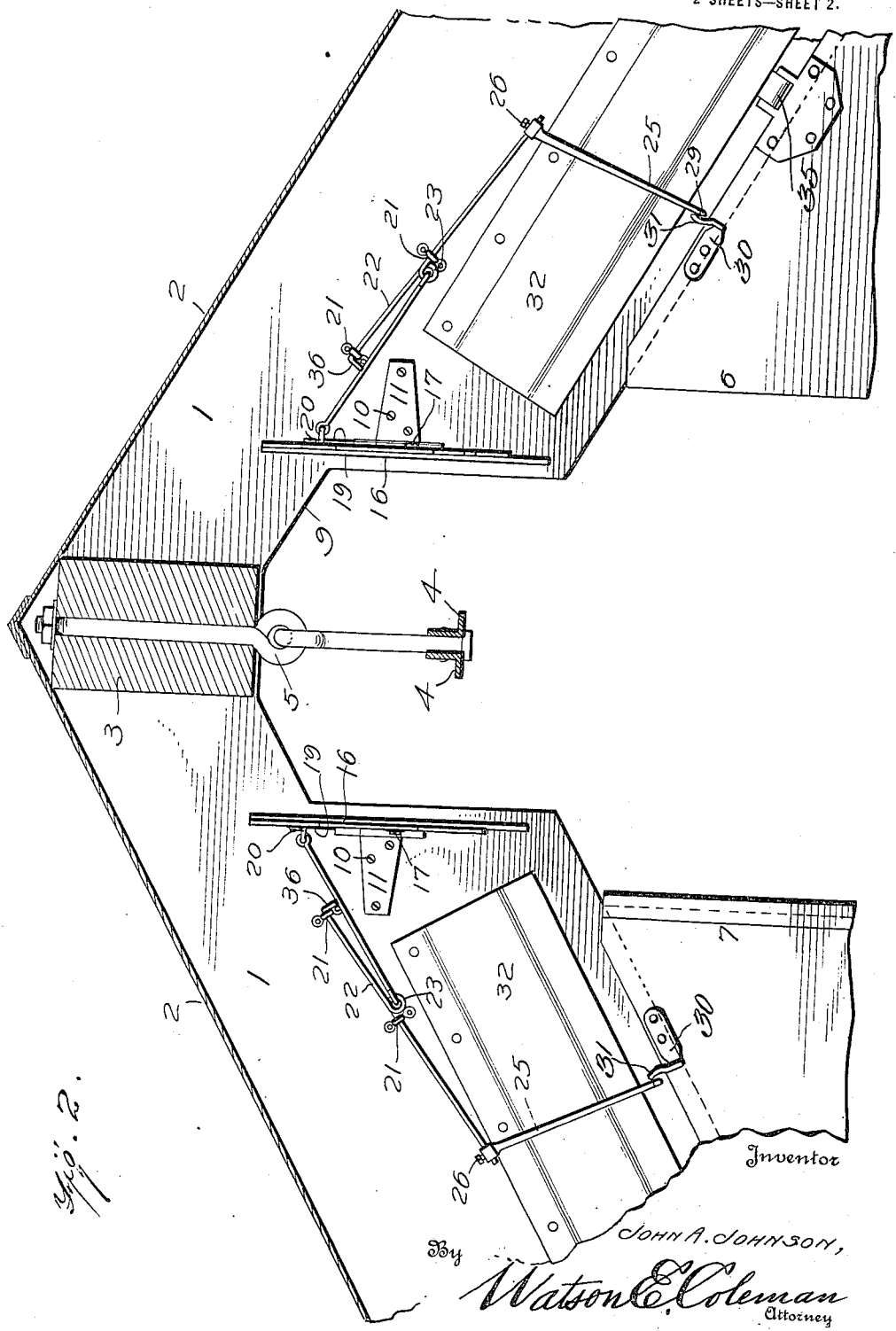

UNITED STATES PATENT OFFICE.

JOHN A. JOHNSON, OF WALCOTT, NORTH DAKOTA.

CLOSURE FOR HAY-FORK-TRACK OPENINGS.

1,375,391.  Specification of Letters Patent.  Patented Apr. 19, 1921.

Application filed April 28, 1920. Serial No. 377,304.

*To all whom it may concern:*

Be it known that I, JOHN A. JOHNSON, a citizen of the United States, residing at Walcott, in the county of Richland and State of North Dakota, have invented certain new and useful Improvements in Closures for Hay-Fork-Track Openings, of which the following is a specification, reference being had to the accompanying drawings.

Generally, the upper part of the front of barns is provided with openings through which the hay fork track extends, in order to permit the carrier which rides on the track to pass through the front of the barn in order to fill the hay mow. As a rule these openings are left open and in the winter time small birds, especially sparrows have a free access to the interior of the mow through the opening. Such birds not only build their nests in the mow particularly around crevises or angle portions of the track, but also they roost on the track, and it is obvious that if this is kept up throughout the winter, the track becomes clogged up by feathers, sticks and the like used to build nests, so that when it is necessary to use the hay fork it is difficult to move the same freely upon the track. Furthermore, the hay in the mow becomes soiled, feathers are scattered throughout the same, and generally speaking the sparrows become a great nuisance in this regard.

Therefore, it is a general and most important aim of the present invention to provide means such as improved closures designed for closing such opening, to keep out the birds. The closures for such opening are constructed to conform to the contour of the track, in order to prevent the birds from entering any of the small openings that would be left around the track if the closure did not conform to the track contour.

The invention further aims to provide closures for the openings, in combination with improved means so operatively connected with the sliding hay fork doors of the barn, that when the doors are open, the closures for the opening are simultaneously opened, and when such doors are closed the closures are likewise closed. Furthermore, it is the aim to provide means on the hay fork doors to coöperate with the closures to retain them in closed positions.

Also the invention still further aims to provide the closures with auxiliary sections adjustably and operatively connected with the closures and relatively adjustable with relation to the track, in order to neatly conform thereto, thereby obviating small openings or passages through which the birds might otherwise pass should such auxiliary closure sections be eliminated.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is an end view of the upper part of a barn showing the improved closures for the track opening as applied and operatively connected to the hay fork doors, Fig. 2 is an end view showing the closures open, and also the hay fork doors in open positions, and Fig. 3 is a sectional view on line 3—3 of Fig. 1, showing the closures open in dotted lines.

Referring more especially to the drawings, 1 designates the upper part of the front of a barn of any conventional construction and 2 denotes the roof and 3 designates a beam, from which the hay fork track 4 is suspended by means of the usual hanger 5.

The front of the barn is provided with the usual construction of hay fork doors 6 and 7, the door 6 being provided with a lap board 8, designed to overlap the door 7 thereby acting as a weather strip to close the space between the two adjacent edges of the doors. The upper part of the front of the barn adjacent the upper portions of the two doors 6 and 7 is provided with an opening 9, through which, as a rule, the hay fork track 4 extends, so as to permit of the passage of the hay fork into and out of the barn, when loading the hay mow or loft.

Secured to the front of the barn as at 10 is a pair of hinges which comprise the leaves 11 and 12. The leaves 11 are carried by the front of the barn while the leaves 12 are secured at 13 to the closures 14 which are of such dimensions as to co⸺r the open⸺ ing 9. These closures 14 each comprises the main portion 15 and the auxiliary portion 16. The main portion 15 of each closure is connected to its respective hinge leaf 12, while the auxiliary section is provided with slot and bolt connections 17 with the main section 15. The auxiliary sections have their adjacent edges constructed and shaped to conform to the contour of the hanger 5 and the cross sectional shape of the hay fork track 4 so that when the closures are in closed positions, all the crevices or openings about the hanger or track are so closed as to prevent the passage of small birds such as sparrows and the like into the barn.

Secured at 18 to the main section of the closures 14 are brackets 19 provided with eyes 20. Mounted in guides 21 on the outer face of the front of the barn are sliding rods 22 which have eyes 23. Links 24 connect the eyes 20 and 23 respectively whereby as the slide rods 22 are moved in their guides, the closures for the opening 9 may be easily swung open when it is desired to permit of the passage of the hay fork into the mow.

Adjustably mounted on the slide rods are abutment arms 25, there being set screws 26 passing through the upper ends of the abutment rods and adapted for engagement with the slide rods for holding the abutment rods in different adjusted positions on the rods.

Secured to the usual hay fork doors 6 and 7 as at 30 are lugs 31 which are disposed so that when the hay fork doors are opened, the lugs 31 will engage the abutment ends 29 of the arms 25 and open the closures to positions shown in Fig. 2.

Also carried by the hay fork doors 6 and 7 and secured thereto as at 27 are abutment lugs or projections 28. These projections or lugs 28 assume positions in the path of the lower abutment ends 29 of the arms 25, and therefore act to coöperate with the ends 29, for the purpose of closing the closures when the hay fork doors are closed. In fact, as the hay fork doors slide into closed position, the projections 28 will engage the ends 29 of the abutment rods 25 and impart sliding motions to the slide rods 22, and as the rods are connected to the closures by means of the links 24, the closures will swing automatically and simultaneously to closed positions.

The hay fork doors are mounted operatively upon conventional or usual form of bird proof door tracks 32, which comprise the tracks proper and overlying guard plates 34.

The hay fork doors have hanger connections 35 with the track 33. The upper adjacent ends of the sliding rods 22 are provided with lugs 36, which are adapted to contact with certain of the guides 21 to limit the sliding rods 22 in their downward diverging sliding movements.

The invention having been set forth, what is claimed as new and useful is:—

1. In a device as set forth, the combination with the front of a barn provided with a hay fork track opening, of sliding hay fork doors, hingedly mounted closures for the track opening, and means connecting the sliding doors and the hingedly mounted closures, whereby upon opening the sliding doors, the closures will simultaneously swing open.

2. In a device as set forth, a housing having a track opening at one end, sliding members adjacent the end of the housing below the opening, hingedly mounted closures for closing the opposite sides of said opening, and means carried by the sliding members and being operatively connected with said closures, whereby as the members are moved to open positions, the elements will simultaneously open.

3. In a device as set forth, a housing provided with a track opening in one of its ends, closures connected to the end of the housing for closing the opening upon each side of the track, movable members mounted in guides on the end of the housing, and adapted to be actuated in downwardly and laterally diverging planes, and operatively connected to the closures, whereby as the members are moved, the closures are simultaneously opened.

4. In a device as set forth, a housing having a track opening in one end, closures for the opposite sides of the opening, operating means mounted on the end of the housing, and members mounted in guides on the end of the housing for movement in downwardly and laterally diverging planes and adapted for operative connection with the operating means for simultaneously opening the closures.

5. In a device as set forth, a housing having a track opening in one end, closures for the opposite sides of the opening, operating means mounted on the end of the housing, and members mounted in guides on the end of the housing for movement in downwardly and laterally diverging planes and adapted for operative connection with the operating means for simultaneously opening the closures, said closures comprising main and auxiliary sections adjustably and operatively connected, said auxiliary sections having their adjacent edges constructed to conform to the contour of the hay fork track.

6. In a device as set forth, the combination with a housing having a track opening in one end, of closures hingedly mounted for closing the opening, operating means mounted in guides on the end of the housing and having connections with the closures, and elements mounted in guides on the end of the housing for downwardly diverging movements from each other and having means to operatively connect with said operating means, for swinging the closures automatically and simultaneously with the movement of the elements.

7. In a device as set forth, the combination with a housing having a track opening in one end, of closures hingedly mounted for closing the opening, operating means mounted in guides on the end of the housing and having connections with the closures, and elements mounted in guides on the end of the housing for downwardly diverging movements from each other and having means to operatively connect with said operating means, for swinging the closures automatically and simultaneously with the movement of the members, said closures comprising main and auxiliary sections, the latter being slidably and operatively connected to the former and having their adjacent edges conforming to the contour of the track which is designed to extend through the opening.

8. In a device as set forth, the combination with a barn having a track opening in one end near its upper part, closures hingedly mounted adjacent the opening on opposite sides of the track, said closures comprising main and auxiliary sections, the latter being adjustably and operatively connected to the former, and having their adjacent edges conforming to the contour of the track and its hanger, slide members mounted in guides on the end of the barn for downward and diverging movements, links connecting the sliding members and the closures respectively, abutments on the sliding members, hay fork doors mounted in guides of the barn for downward and diverging movements and having means to coöperate with the abutments for moving the sliding members, for simultaneously opening the closures when the doors are moved.

9. In a device as set forth, the combination with a housing having a track opening in one end, of closures hingedly mounted for closing the opening, operating means mounted in guides on the end of the housing and having connections with the closures, and elements mounted in guides on the end of the housing for downwardly diverging movements from each other and having means to operatively connect with said operating means, for swinging the closures automatically and simultaneously with the movement of the elements, and means on the downwardly and diverging sliding members to coöperate with the closures to hold them in closed positions when the members are closed, thereby preventing the closures from being opened until the members are moved.

10. In a device as set forth, the combination with a barn having a track opening in one end near its upper part, closures hingedly mounted adjacent the opening on opposite sides of the track, said closures comprising main and auxiliary sections, the latter being adjustably and operatively connected to the former, and having their adjacent edges conforming to the contour of the track and its hanger, slide members mounted in guides on the end of the barn for downward and diverging movements, links connecting the sliding members and the closures respectively, abutments on the sliding members, hay fork doors mounted in guides on the barn for downward and diverging movements and having means to coöperate with the abutments for moving the sliding members, for simultaneously opening the closures when the doors are moved, said sliding members having means coöperating with certain of its guides, for limiting the sliding members and their movements.

In testimony whereof I hereunto affix my signature.

JOHN A. JOHNSON.